(12) United States Patent
So et al.

(10) Patent No.: US 7,861,647 B2
(45) Date of Patent: Jan. 4, 2011

(54) KITCHEN UTENSIL WITH A SUCTION BASE MECHANISM

(75) Inventors: Kwok Kuen So, 2/F., Chuan Yuan Factory Building, 342-344 Kwun Tong Road, Kwun Tong, Kowloon (HK); Abel Yiu Chung Wan, Tsuen Wan (HK)

(73) Assignee: Kwok Kuen So, Kowloon (HK)

( * ) Notice: Subject to any disclaimer, the term of this patent is extended or adjusted under 35 U.S.C. 154(b) by 21 days.

(21) Appl. No.: 12/024,182

(22) Filed: Feb. 1, 2008

(65) Prior Publication Data

US 2009/0193661 A1    Aug. 6, 2009

(51) Int. Cl.
*A47J 37/10* (2006.01)
*B65D 25/00* (2006.01)

(52) U.S. Cl. .................. 99/339; 99/495; 99/646 R; 220/483; 220/635; 220/636

(58) Field of Classification Search ........... 99/509–513, 99/485–489, 495, 326–333, 339, 340, 646 R; 34/58; 220/635, 634, 737, 739, 483, 636; 248/205.6, 205.5, 206.1, 206.5, 206.2, 309.3
See application file for complete search history.

(56) References Cited

U.S. PATENT DOCUMENTS

| | | | | |
|---|---|---|---|---|
| 4,090,310 A | * | 5/1978 | Koff | .............. 34/58 |
| 4,702,162 A | * | 10/1987 | Sontheimer et al. | .......... 99/495 |
| 5,474,206 A | * | 12/1995 | Herring, Sr. | ............... 220/636 |
| 5,562,025 A | * | 10/1996 | Bull et al. | ..................... 99/495 |
| 5,865,109 A | * | 2/1999 | Bull | ............................ 99/495 |
| 5,904,090 A | * | 5/1999 | Lillelund et al. | ............. 99/495 |
| 5,927,304 A | * | 7/1999 | Wen | .......................... 134/153 |
| 5,992,309 A | * | 11/1999 | Mulhauser et al. | ............ 99/495 |
| 6,018,883 A | * | 2/2000 | Mulhauser | .................... 34/58 |
| 6,343,546 B2 | * | 2/2002 | Ancona et al. | ................ 99/495 |
| 6,571,976 B1 | * | 6/2003 | Sonnabend | ................. 220/483 |
| 6,622,618 B1 | * | 9/2003 | Glucksman et al. | .......... 99/495 |
| 6,666,420 B1 | * | 12/2003 | Carnevali | ................. 248/205.8 |
| 7,658,354 B2 | * | 2/2010 | Wang | ...................... 248/205.5 |
| 2001/0035101 A1 | * | 11/2001 | Ancona et al. | ................ 99/495 |
| 2005/0166768 A1 | * | 8/2005 | Porat et al. | .................... 99/495 |
| 2008/0289581 A1 | * | 11/2008 | Cox et al. | ................ 119/61.54 |

\* cited by examiner

*Primary Examiner*—Reginald L Alexander
(74) *Attorney, Agent, or Firm*—William J. Sapone; Coleman Sudol Sapone P.C.

(57) ABSTRACT

A kitchen utensil is disclosed as including a body member, a switch member, and a suction member, wherein when said suction member rests on a support surface, said switch member is swivellable relative to said body member and said suction member between a first position in which the space between said suction member and said support surface is of a first volume and a second position in which at least part of said suction member is moved away from said surface whereby the space between said suction member and said support surface is of a second volume which is larger than said first volume to releasably secure said utensil to said support surface.

8 Claims, 8 Drawing Sheets

KITCHEN UTENSIL WITH A SUCTION BASE MECHANISM

This invention relates to a kitchen utensil with a suction base mechanism, and in particular such a utensil which may be releasably secured by the suction base mechanism to a support surface.

BACKGROUND OF THE INVENTION

There are in existence a large variety of kitchen utensils which, when in use, are supported by a working top. Such kitchen utensils may include meat choppers, potato chippers, electric blenders, salad spinners and the like. In order to enhance the performance of such utensils, it is desirable to releasably secure them to the working top.

One existing mechanism for releasably securing a kitchen utensil to a working top includes a suction base made of a resilient material. When in use, the user places the kitchen utensil on the working top with the suction base abutting working top. The user then presses the utensil against the working top to drive out some of the air originally trapped between the suction base and the working top, so that the air pressure in the space trapped between the suction base and the working top is lower than the atmospheric pressure. The ambient atmospheric pressure thus assists in retaining the kitchen utensil on the working top. It is however found in practice that the suction force generated by the pressure difference is relatively weak, and will decrease during use, such that stability and performance of the utensil are adversely affected.

It is thus an object of the present invention to provide a kitchen utensil in which the aforesaid shortcomings are mitigated, or at least to provide a useful alternative to the public.

SUMMARY OF THE INVENTION

According to the present invention, there is provided a kitchen utensil including a body member, a switch member, and a suction member, wherein when said suction member rests on a support surface, said switch member is swivellable relative to said body member and said suction member between a first position in which the space between said suction member and said support surface is of a first volume and a second position in which at least part of said suction member is moved away from said surface whereby the space between said suction member and said support surface is of a second volume which is larger than said first volume to releasably secure said utensil to said support surface.

BRIEF DESCRIPTION OF THE DRAWINGS

A preferred embodiment of the present invention will now be described, by way of example only, with reference to the accompanying drawings, in which.

DETAILED DESCRIPTION OF THE PREFERRED EMBODIMENT

Figure 1:
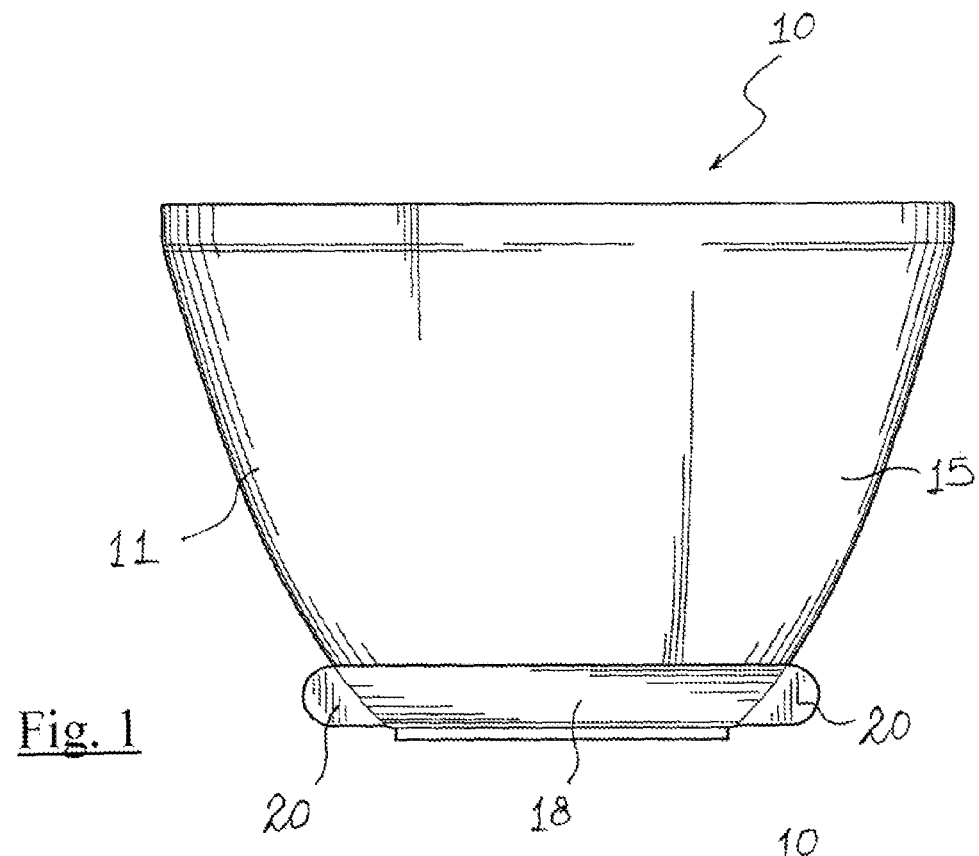
FIG. 1 is a front view of a bowl according to a preferred embodiment of the present invention.
Figure 2:
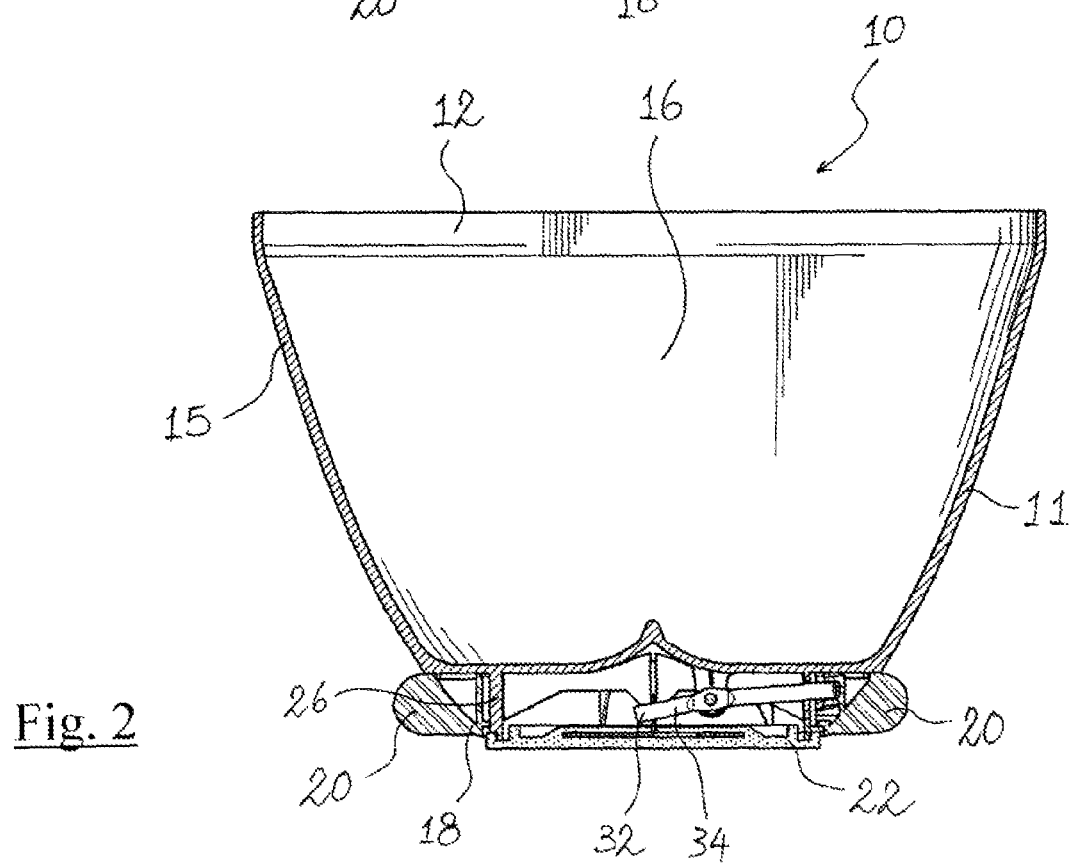
FIG. 2 is a sectional view of the bowl shown in FIG. 1.
Figure 3:
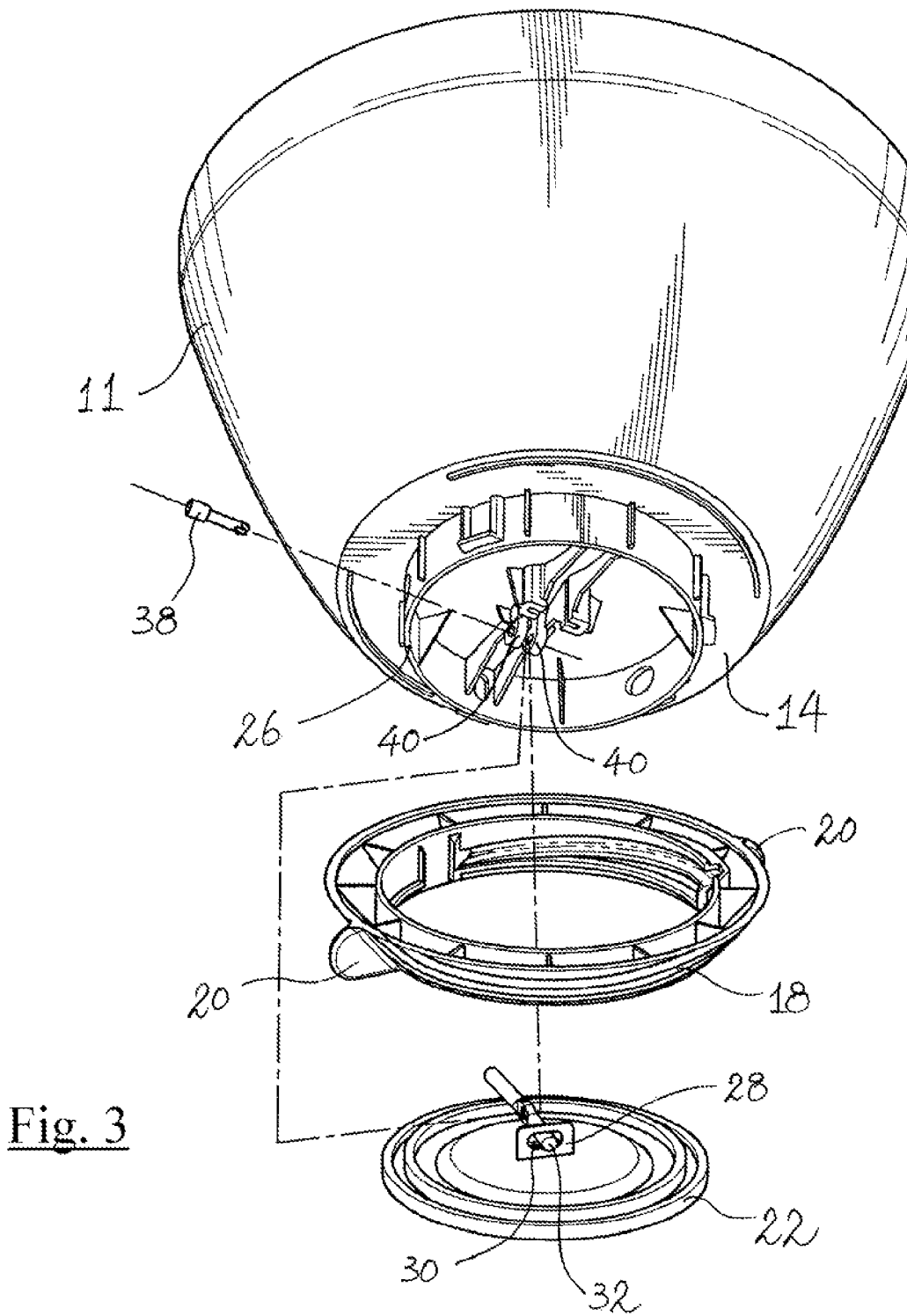
FIG. 3 is an exploded view of the bowl shown in FIG. 1.

A bowl according to a preferred embodiment of the present invention is shown in FIGS. 1 to 3, and generally designated as 10. The bowl 10 has a body 11 with an open upper end 12, a closed lower end 14, and a wall 15, defining a cavity 16 for containing, for example, foodstuffs.

The lower end 14 of the body 11 is engaged with a switch ring 18 with two diametrically opposite tabs 20. The lower end 14 of the body 11 is also engaged with a resilient suction pad 22, which may be made of synthetic or natural rubber. When the bowl 10 is assembled, the switch ring 18 sits on and contacts the pad 22.

Figure 4:
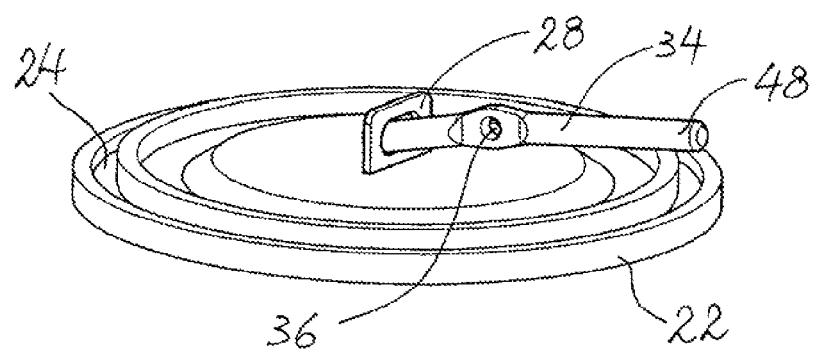
FIG. 4 is a suction pad of the bowl shown in FIG. 3.

Turning to FIG. 4, it can be seen that the pad 22 has an outer annular trough 24 for receiving an annular ridge 26 extending from the closed lower end 14 of the body 11. A plate 28 fixedly engaged with the pad 22 extends upwardly from the pad 22 towards the closed lower end 14 of the body 11. The plate 28 has a hole 30 (see FIG. 3) through which a first longitudinal end 32 of a lever 34 extends. Along the length of the lever 34 is a hole 36 through which a pin 38 extends. As can be seen in FIG. 3, the pin 38 is also received through a pair of ears 40 fixed to the lower end 14 of the body 11. The lever 34 can therefore pivot relative to the pin 38, the ears 40 and the body 11 of the bowl 10.

Figure 5:
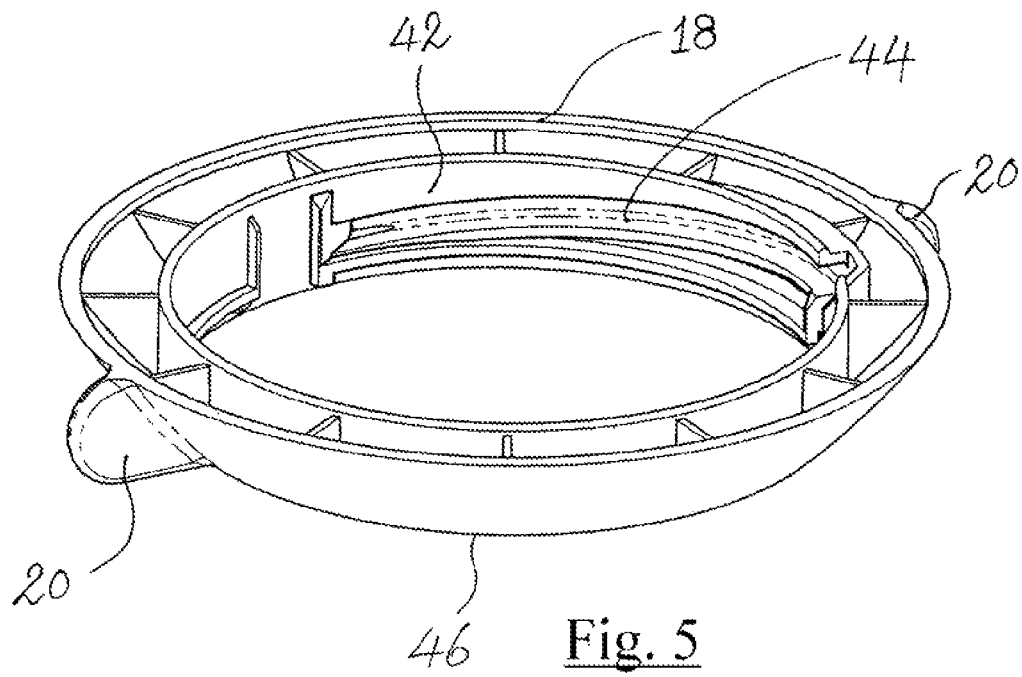
FIG. 5 is a switch ring of the bowl shown in FIG. 3.

Turning now to FIG. 5, such shows the switch ring 18. As mentioned above, the switch ring 18 has two diametrically opposite tabs 20. Along an inner surface 42 of the switch ring 18 is a groove 44 which is slanted relative to the lower edge 46 of the switch ring 18. When assembled, the groove 44 is neither parallel nor perpendicular to a longitudinal axis L-L of the body 11 of the bowl 10 (see FIG. 12). The groove 44 is wide enough to receive a second longitudinal end 48 of the lever 34 (see FIG. 4).

Figure 6:
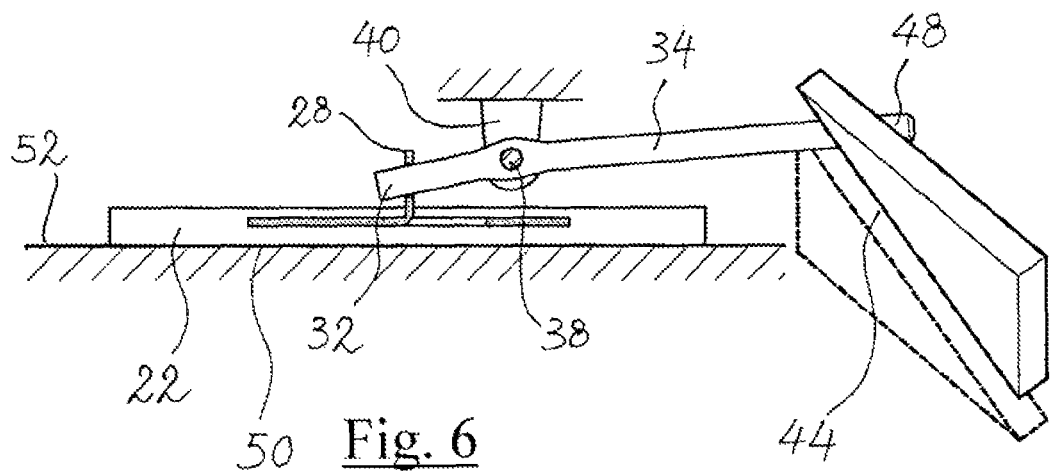
FIGS. 6 and 7 show schematically the principle of operation of the suction base mechanism of the bowl shown in FIG. 1.
Figure 7:
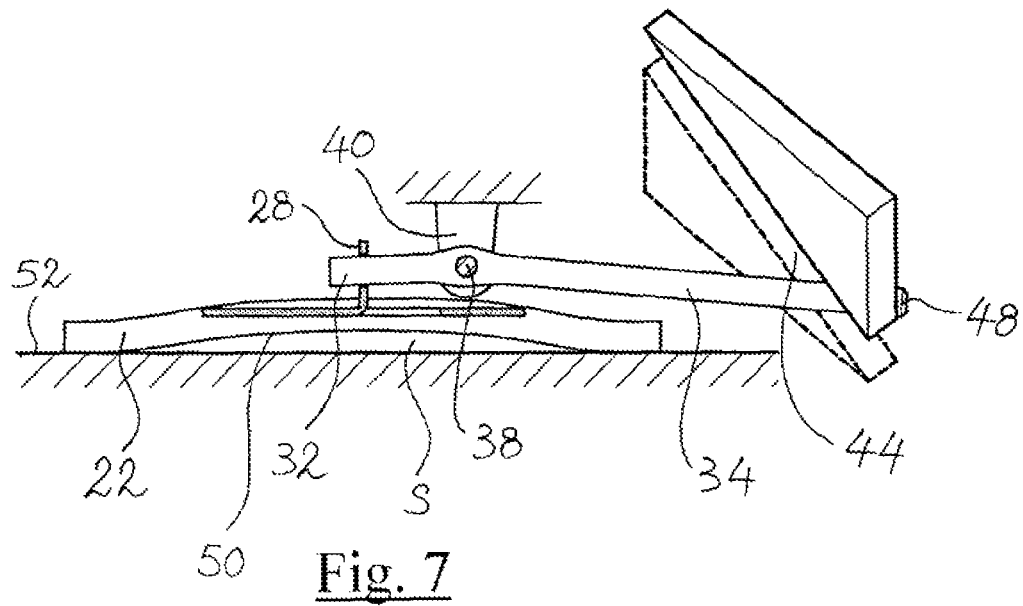

FIGS. 6 and 7 show the principle of operation of the suction base mechanism (including the switch ring 18 and the pad 22) of the present invention. In the situation as shown in FIG. 6, a lower surface 50 of the pad 22 lies flat on a support surface 52. When the second longitudinal end 48 of the lever 34 is caused to travel along and relative to the groove 44 downwardly relative to the lower edge 46 of the switch ring 18, the lever 34 will pivot about the longitudinal axis of the pin 38 which is fixed relative to the body 11, in which case the first end 32 of the lever 34 will be raised, thus pulling up the plate 28. The central portion of the lower surface 50 of the pad 22 will thus be pulled away from the support surface 52. It can be seen that the volume of the space S between the pad 22 and the support surface 52 in FIG. 7 is larger than that between the pad 22 and the support surface 52 in FIG. 6. The air pressure in the space S is therefore smaller than the ambient atmospheric pressure, and the difference between the atmospheric pressure and reduced air pressure in the space S assists in securing the pad 22, and thus the bowl 10, to the support surface 52.

To release the bowl 10 from the support surface 52, the second longitudinal end 48 is caused to travel along and relative to the groove 44, upwardly relative to the lower edge 46 of the switch ring 18. The lever 34 will thus pivot about the longitudinal axis of the pin 38, such that the first end 32 of the lever 34 will be lowered, thus pressing the pad 22 back to the normal configuration as shown in FIG. 6. The suction engagement between the pad 22 and the support surface 52 is thus released, whereupon the bowl 10 may be removed from the support surface 52.

Figure 8:
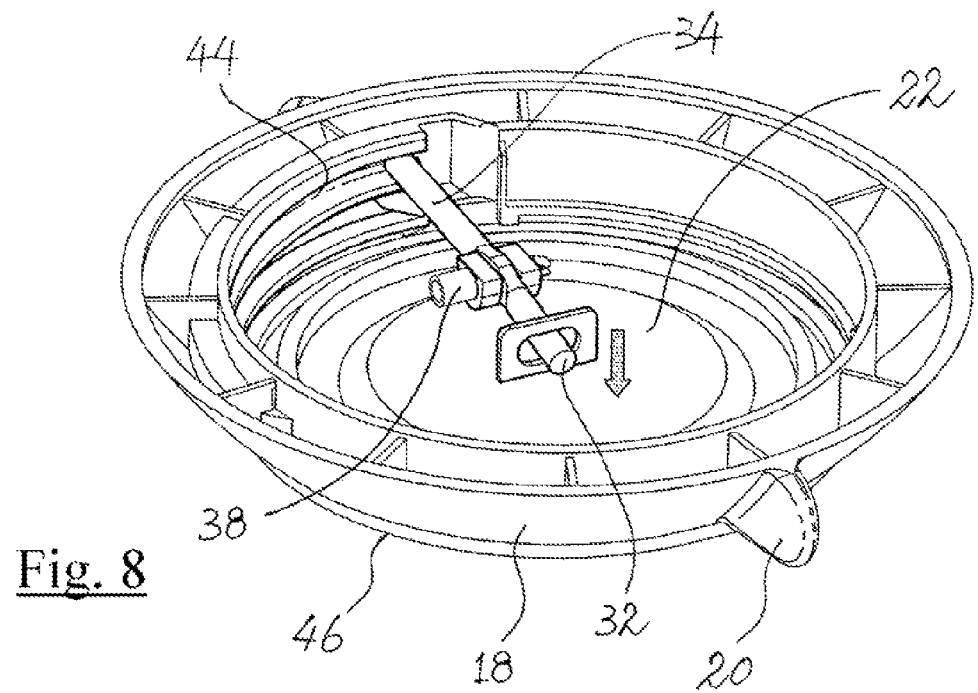
FIGS. 8 and 9 show engagement of the suction pad shown in FIG. 4 and the switch ring shown in FIG. 5, and the manner of operation of the suction base mechanism of the bowl shown in FIG. 1.
Figure 9:
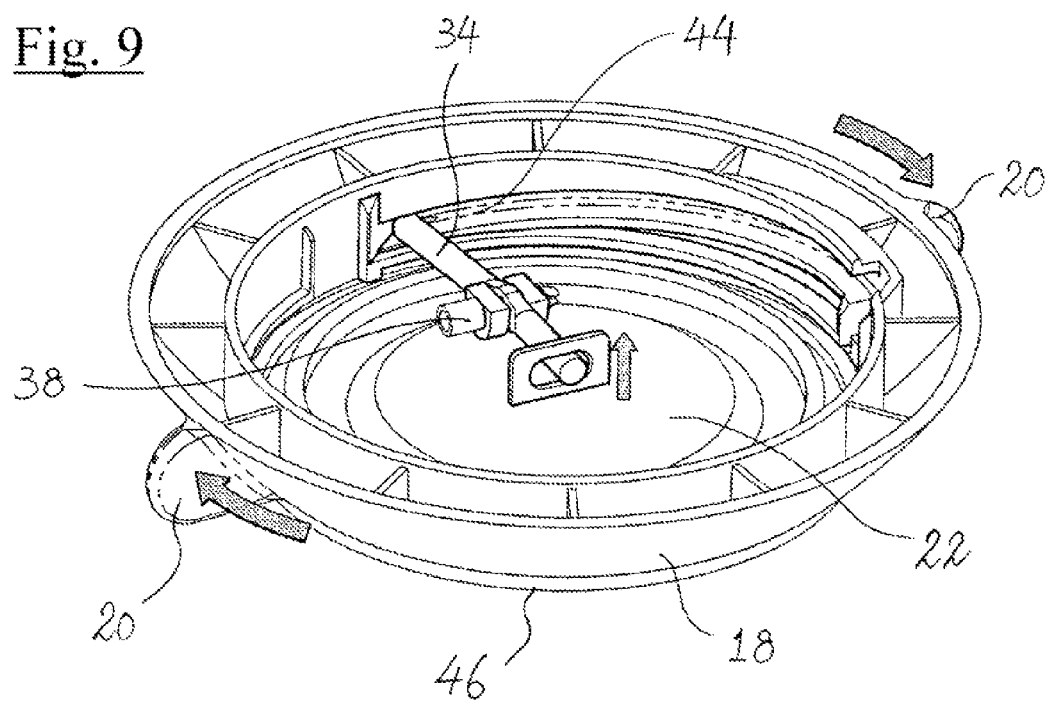

FIGS. 8 and 9 show the operation of the suction base mechanism of the present invention. In actual operation, the switch ring 18 may be swivelled, e.g. by operating the tabs 20, in the direction indicated by the arrows in FIG. 9, relative to the rest of the bowl 10, thus causing the groove 44 to move relative to the second end of the lever 34. As the groove 44 is slanted relative to the lower edge 46 of the switch ring 18, such a rotational movement of the switch ring 18 will cause the second longitudinal end of the lever 34 to move towards the lower edge 46. The lever 34 will then pivot about the longitudinal axis of the pin 38 to raise the first longitudinal end 32, which in turn raises the plate 48 and the central portion of the pad 22, thus deforming the pad 22, to thereby secure the bowl 10 to the support surface. Swiveling of the switch ring 18 in the reverse direction will cause the pad 22 to return to the configuration as shown in FIG. 8, thus releasing the engagement between the bowl 10 and the support surface.

Figure 10:
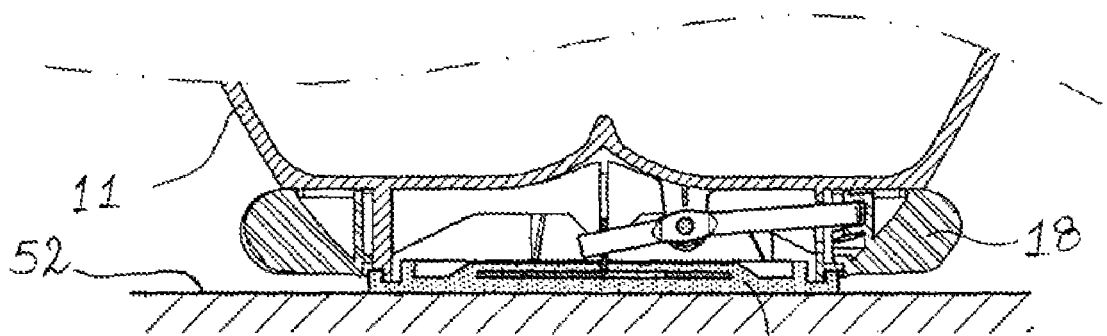
FIG. 10 is a partial sectional view of the bowl shown in FIG. 1, with the suction pad in a normal flat configuration.
Figure 11:
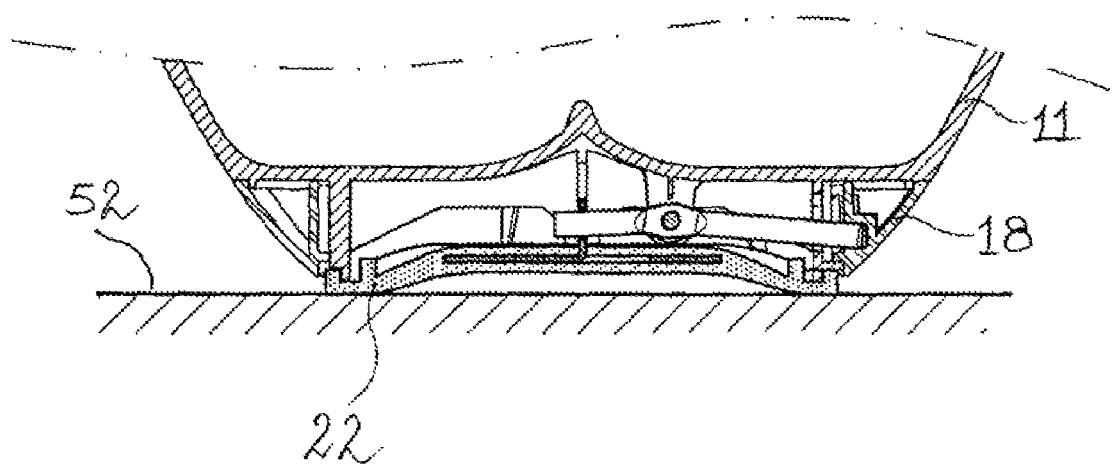
FIG. 11 is a partial sectional view of the bowl shown in FIG. 1, with the suction pad in deformed configuration.

FIG. 10 shows the body 11 of the bowl 10 as assembled with the switch ring 18 and the pad 22, in which the pad 22 lies flat on the support surface 52. In FIG. 11, the central portion of the pad 22 is raised away from the support surface 52, deforming the pad 22, and forming a region in which the air pressure is smaller than the atmospheric pressure.

Figure 12:
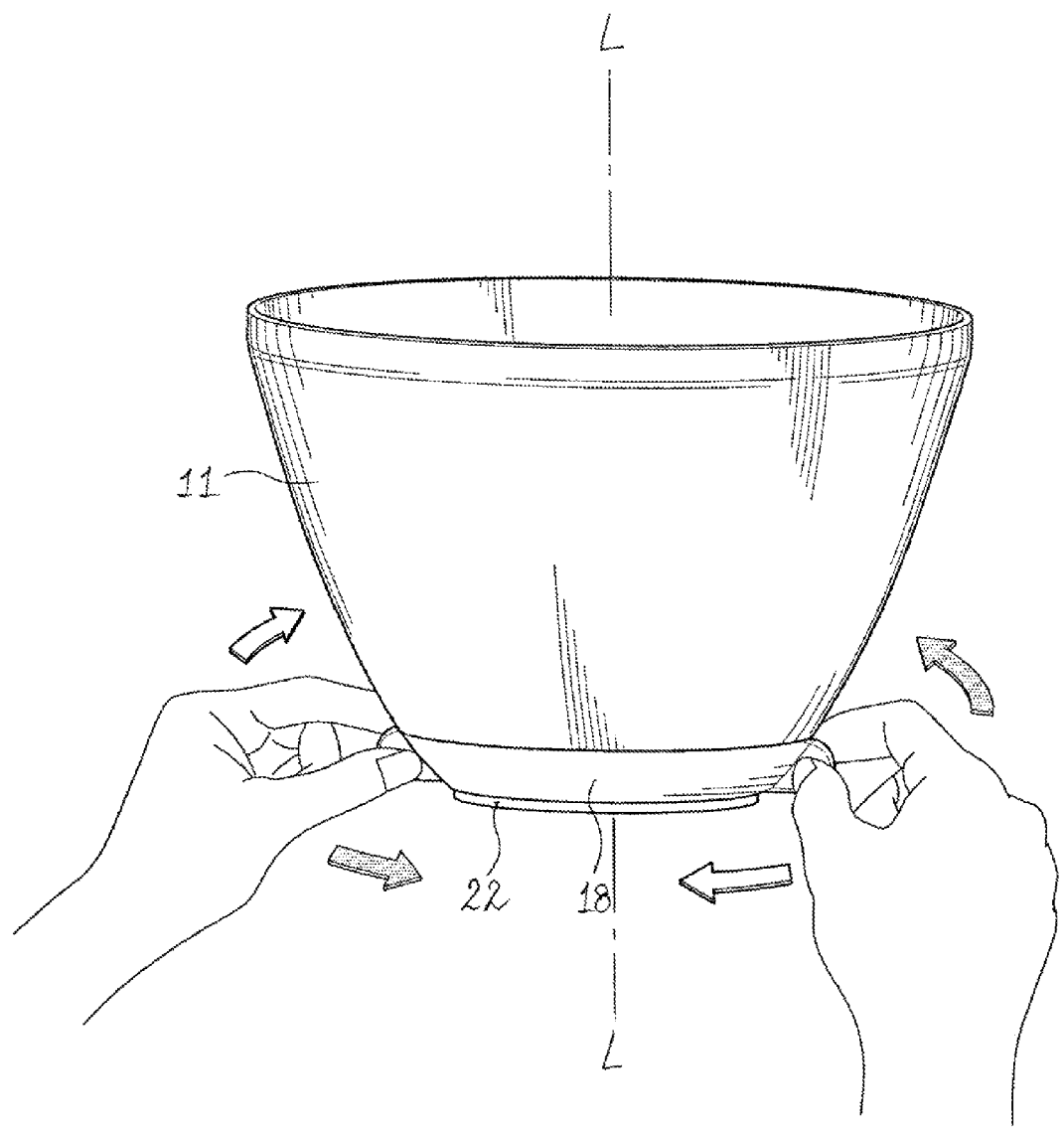
FIG. 12 shows manual operation of the switch ring of the bowl shown in FIG. 1.
Figure 13:
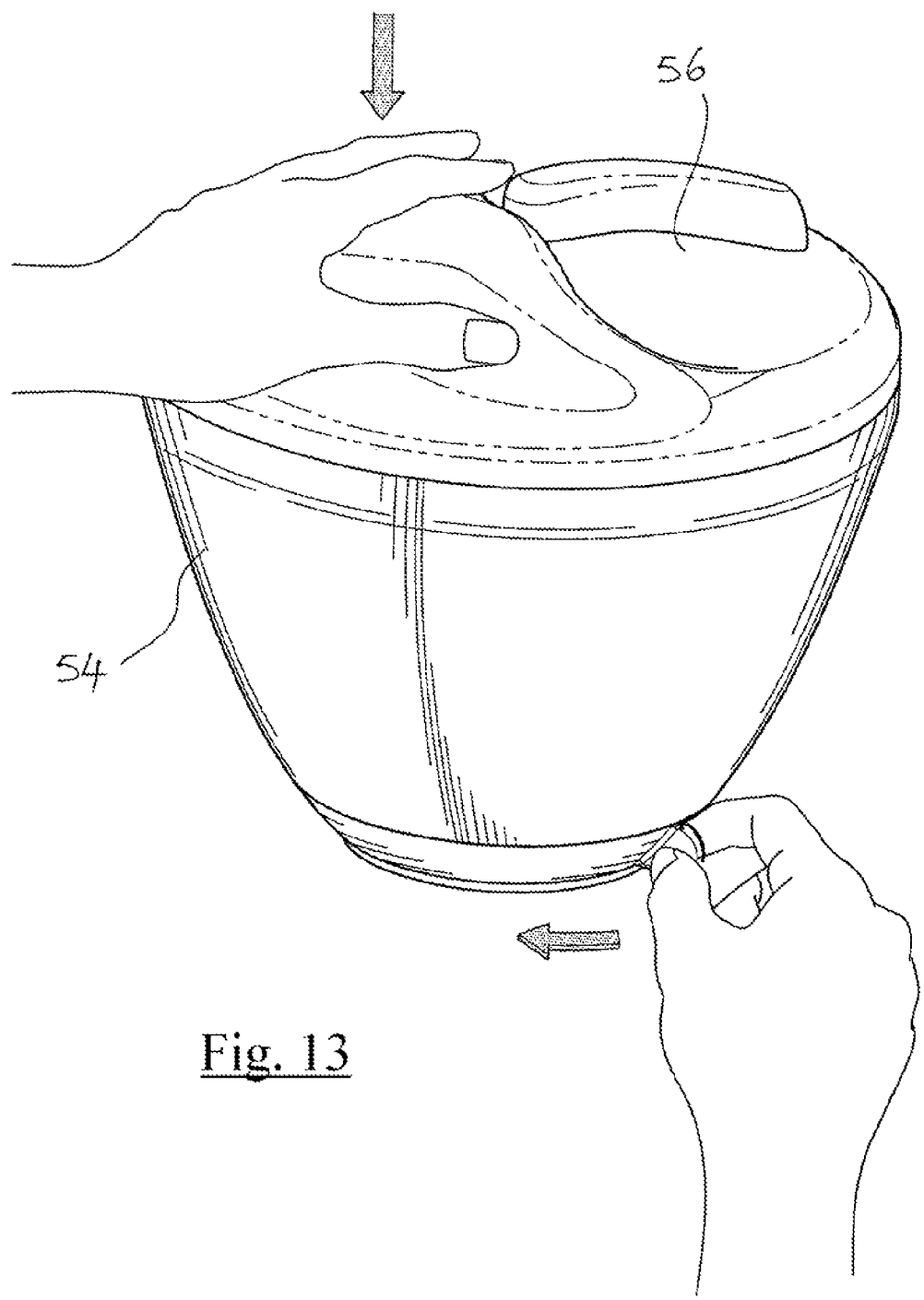
FIG. 13 shows incorporation of the bowl shown in FIG. 1 in a salad spinner.

FIG. 12 shows swivelling of the switch ring 18 relative to the body 11 and the pad 22 of the bowl 10 about the longitudinal axis L-L of the body 11 of the bowl 10. As shown in FIG. 13, the bowl 10 may form part of a salad spinner 54 with a top cover 56.

It should be understood that the above only illustrates an example whereby the present invention may be carried out, and that various modifications and/or alterations may be made thereto without departing from the spirit of the invention.

It should also be understood that various features of the invention which are, for brevity, here described in the context of a single embodiment, may also be provided separately or in any appropriate sub-combinations.

The invention claimed is:

1. A kitchen utensil including:
a body member,
a switch member, and
a releasable suction member, said switch member being connected thereto for operating said releasable suction member, wherein when said suction member rests on a support surface, said switch member is swivellable relative to said body member and said suction member between a first position in which the suction member is in a release position, a space between said suction member and said support surface being of a first volume and a second position in which the suction member draws a suction between the suction member and the support surface so as to fix the body member to the support surface, at least part of said suction member being moved away by said switch member from said support surface whereby the space between said suction member and said support surface increases to a second volume which is larger than said first volume to releasably secure said utensil to said support surface, and, wherein said suction member is engaged with said switch member via a lever member which is pivotable about an axis substantially perpendicular to a longitudinal axis of said body member whereby swiveling said switch member between said first position and said second position causes said lever member to pivot about said perpendicular axis to cause said suction member to move between said release position and said securing position.

2. A kitchen utensil according to claim 1 wherein said switch member is swivellable about an axis parallel to said longitudinal axis of said body member.

3. A kitchen utensil according to claim 1 wherein said axis about which said lever member is pivotable is fixed relative to said body member.

4. A kitchen utensil according to claim 1 wherein a first end of said lever member is engaged with said suction member.

5. A kitchen utensil according to claim 4 wherein a second end of said lever member is received within a slanted groove of said switch member such that rotating said switch member moves the second end of said lever member relative to the slanted groove for moving the suction member between the release position and the securing position.

6. A kitchen utensil according to claim 5 wherein said groove is neither parallel nor perpendicular to said longitudinal axis of said body member.

7. A kitchen utensil according to claim 5 wherein swiveling of said switch member causes relative movement between said groove and said second end of said lever member, which causes said lever member to pivot to deform said suction member.

8. A kitchen utensil according to claim 1 wherein said utensil is a salad spinner.

* * * * *